Dec. 2, 1958  W. W. GRAUSTEIN, JR  2,863,117
PHASE MEASURING SYSTEM
Filed Feb. 2, 1954  2 Sheets-Sheet 1
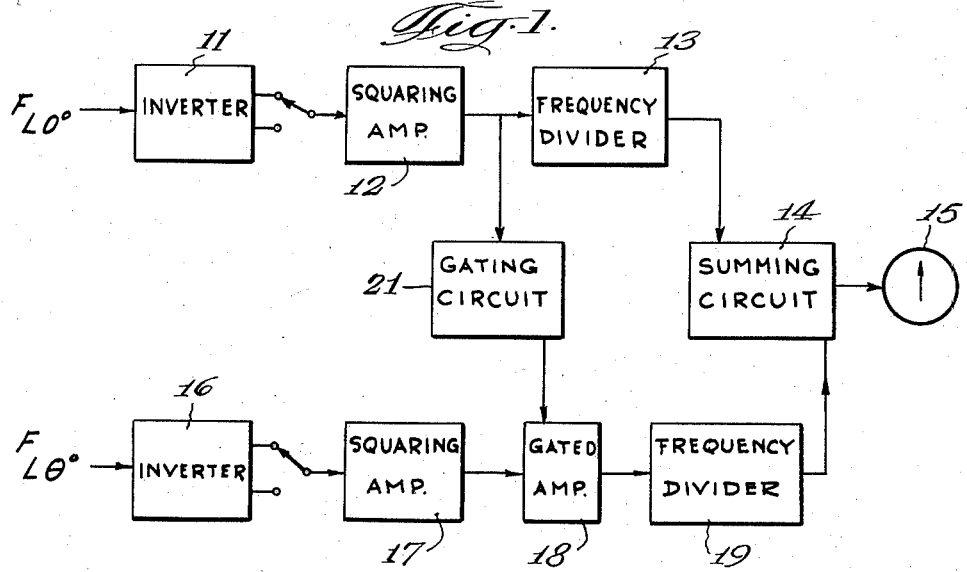
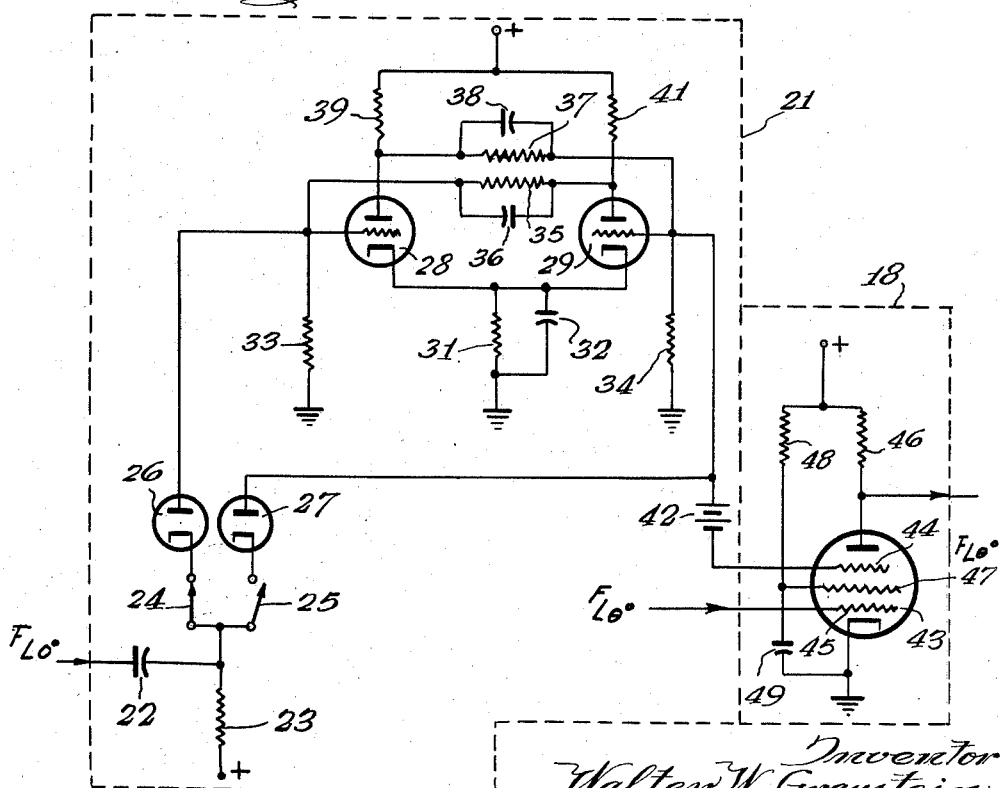
Inventor
Walter W. Graustein, Jr.
By Alois W. Graf
attorney Dec. 2, 1958

W. W. GRAUSTEIN, JR 2,863,117

PHASE MEASURING SYSTEM

Filed Feb. 2, 1954

Inventor
Walter W. Graustein, Jr.
By Alvin W. Graf
Attorney 2,863,117
Patented Dec. 2, 1958

2,863,117

PHASE MEASURING SYSTEM

Walter W. Graustein, Jr., Watertown, Mass., assignor, by mesne assignments, to Acton Laboratories, Inc., Acton, Mass.

Application February 2, 1954, Serial No. 407,641

8 Claims. (Cl. 324—85)

The present invention relates to a phase measuring system, and more particularly to a system for phase angle measurement of two signals of the same frequency irrespective of wave shape.

Numerous phase measurement systems have been proposed, most of which use pulse-position type phase indicators. Such phase indicators have erratic regions in the vicinity of 0° and 360°. If it is proposed to use a summing type of phase indicator, there still is the problem of certain ambiguities around 0° and 360°. In accordance with the present invention it is proposed to eliminate the basic ambiguity of the summing type of phase indicator by employing frequency division.

It, therefore, is an object of the present invention to provide an improved phase measuring system having no ambiguities in the vicinity of 0° and 360°.

A further object of the invention is to provide an improved phase measuring system having an extended frequency response characteristic.

A further object of the invention is to provide an improved phase measuring system which will measure the phase angle regardless of the incoming signal characteristics.

Still another object of the invention is to provide an improved phase measuring system to measure the angle between signals of non-similar wave shapes, but having the same frequency.

Other and further objects of the invention subsequently will become apparent by reference to the following description taken in conjunction with the accompanying drawings, wherein:

Figure 1 is a block diagram of a system employing the present invention for phase measurement;

Figure 2 is a circuit diagram of a gating circuit used in the system of Figure 1;

Figure 3:
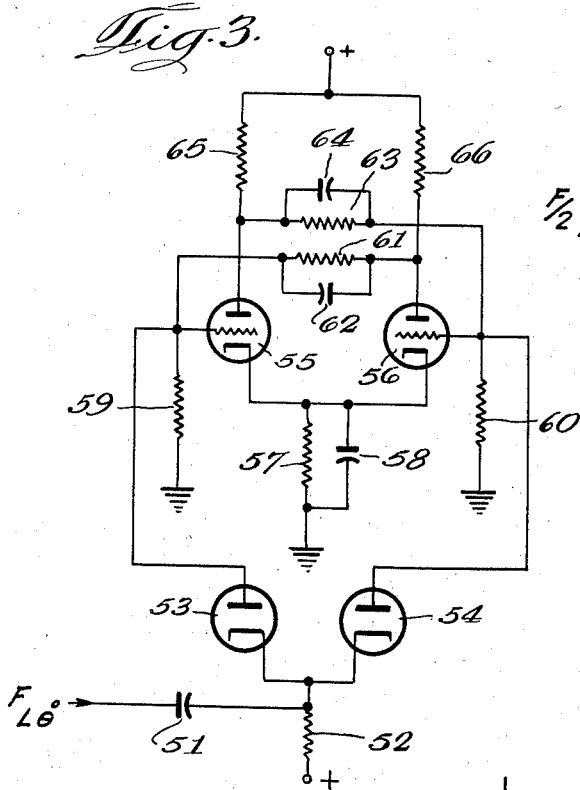
Figure 3 is a circuit diagram of a flip-flop frequency divider used in each channel in the system of Figure 1.

The block diagram in Figure 1 shows that one channel for a signal, which will be designated as the "reference channel," employs an inverter 11 which is connected to a limiting or squaring amplifier 12 which supplies a signal to a frequency divider 13, which in turn supplies a signal to a summing circuit 14 provided with a suitable indicating device 15. The other channel for a signal to be compared with that passing through the first or reference channel also employs an inverter 16 connected to a forming or squaring amplifier 17. The squaring amplifier 17 supplies a signal to a gated amplifier 18, which in turn controls the operation of a frequency divider 19 having its output supplied to the summing circuit 14. The gated amplifier 18 is controlled in operation by a gating circuit 21 which receives its controlled energy or signal from the first channel in the squaring amplifier 12.

From Figure 1 it will be noted that two channels are provided for the comparison of two signals of the same frequency F. The reference signal has 0° angularity, and the compared signal has $\theta°$ angularity with respect to the first signal. Each of the signals is squared and amplified by the respective squaring amplifiers 12 and 17, which are of conventional circuit design, and hence require no specific illustration in the present application. The squared signals are then differentiated and used to trigger a counter type of frequency divider having a ratio of 2:1 in each channel, designated by the frequency dividers 13 and 19. The outputs of the frequency dividers 13 and 19, therefore, are at one-half of the frequency of the signals being compared, and are fed to the summing type of phase indicator.

Since the frequency dividers are of the counter circuit type, they have an inherent ambiguity, thus making it necessary that both frequency dividers be started from the same time interval or position. The counter in the reference channel must always be allowed to start first. In order to assure this the gating circuit 21 and the gated amplifier are employed.

The gating circuit is shown in Figure 2, and receives a signal F through a coupling capacitor 22 connected to a resistor 23 having one end connected to a suitable source of potential and the other end connected by switches 24 and 25 to the cathodes of the diodes 26 and 27. The diodes 26 and 27 are connected to the grids of a pair of vacuum tubes 28 and 29 connected in the standard Eccles-Jordan flip-flop circuit. The cathodes of the vaccum tubes 28 and 29 have a common biasing resistor 31 which is by-passed by a capacitor 32 and connected to ground. The grounded grid resistors 33 and 34 are provided for the grids of the tubes 28 and 29. The grid of the vacuum tube 28 is connected to the anode of the vacuum tube 29 through the usual circuit employing a resistor 35 by-passed by a capacitor 36. Similarly the grid of the vacuum tube 29 is connected to the anode of the vacuum tube 28 by a circuit which includes a resistor 37 in parallel with a capacitor 38. The anodes of the vacuum tubes 28 and 29 are provided with suitable anode resistors 39 and 41, respectively connected to a suitable source of anode potential. The grid of the vacuum tube 29 is connected through a source of biasing potential 42 to the grid of the gated amplifier tube 43. The signal applied to the reference channel frequency divider 13 causes it to pass from one equilibrium condition to another. The Eccles-Jordan flip-flop circuit at the same time removes the negative bias from the gating amplifier 43 provided by the bias source 42. The vacuum tube 43 has a grid 44 to which this bias normally is applied. Another grid 45 receives the signal to be compared from the squaring amplifier 17. The cathode of the vacuum tube 43 is connected to ground. The anode of the vacuum tube 43 is provided with an anode coupling resistor 46 connected to a suitable source of potential. The anode of the vacuum tube 43 is connected to supply a signal to the frequency divider 19. The vacuum tube 43 is provided with another grid 47 connected by a resistor 48 to the source of anode potential. The grid 47 is by-passed to ground by a capacitor 49. The operation of the gating circuit 21 and the gated amplifier 18 is such that the complete operation occurs during an interval smaller than that required for the highest accuracy at the highest frequency at which a comparison of phase is to be made between the two signals in the two channels.

The foregoing arrangement eliminates the possible ambiguity at 180° due to the inherent characteristic of the flip-flop type of frequency dividers. The foregoing arrangement assures that both frequency dividers start to operate from the same equilibrium position upon the application of an outside signal, and that the frequency divider 13 in the reference channel operates prior to the frequency divider 19 in the other channel. This is accomplished by the use of the gating circuit 21 and the gated amplifier 18.

Each of the frequency dividers 13 and 19 employs a circuit similar to that shown in Figure 3 wherein the signal in the channel is applied through a coupling capacitor 51 to the common juncture between a resistor 52 and the cathodes of two diodes 53 and 54. One terminal of the resistor 52 is connected to a suitable source of potential. The diodes 53 and 54 are connected to the grids of a pair of vacuum tubes 55 and 56 connected in a conventional flip-flop circuit. The cathodes of these vacuum tubes are biased by a common resistor 57 by-passed by a capacitor 58. Suitable grounded grid resistors 59 and 60 are provided for the tubes 55 and 56 respectively. The grid of the vacuum tube 55 is connected through a circuit including a resistor 61 and a by-passed capacitor 62 to the anode of the vacuum tube 56. The grid of the vacuum tube 56 is connected through a circuit including a resistor 63 in parallel with a capacitor 64 connected to the anode of the vacuum tube 55. The anodes of the vacuum tubes 55 and 56 are provided with anode coupling resistors 65 and 66, respectively connected to a suitable source of anode potential. The grid of the vacuum tube 56 is connected to the summing circuit 14.

It will be recognized that the circuit shown in Figure 3 is the conventional flip-flop multivibrator. The squared signal applied to the capacitor 51 is differentiated by the circuit including the diodes 53 and 54. The stable operating condition for the multivibrator is for one tube to be conducting and the other tube to be cut-off. A flip-over or transfer of conduction occurs when a negative pulse is applied to the input terminals.

Figure 4:
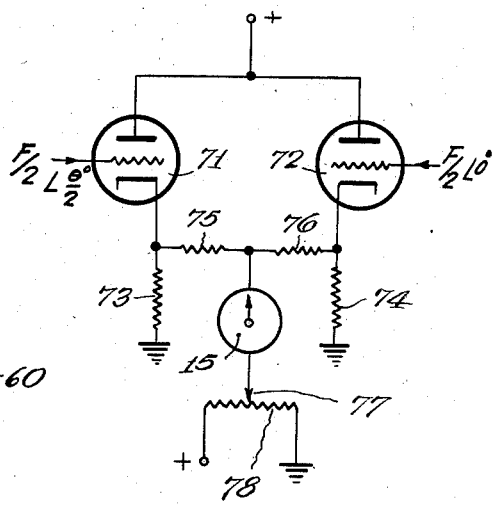
Figure 4 is a circuit diagram of the phase indicator summing circuit employed in the system of Figure 1.

The summing circuit 14 is shown in Figure 4 employing a plurality of vacuum tubes 71 and 72 having their anodes connected together to a suitable source of potential. The grids of the vacuum tubes 71 and 72 are connected to the frequency dividers 13 and 19. The cathodes of the vacuum tubes 71 and 72 are connected to ground through resistors 73 and 74 respectively. The cathodes of the vacuum tubes 71 and 72 are connected together through a circuit including two resistors 75 and 76, the common juncture of which is connected to the indicating instrument 15 having its other terminal connected to the movable contact 77 of a voltage divider 78 connected between ground and a suitable source of potential. It will be appreciated that the frequency divider circuits 13 and 19 supply signals to the vacuum tubes 72 and 71 respectively of identical output level. Thus the signals applied to the grids of the vacuum tubes 72 and 71 have amplitudes independent of the strength of the signal voltages first supplied to the inverters 11 and 16. Since they have the same amplitude, an output voltage is developed by the summing circuit which is the algebraic sum of the two square waves which depends upon the relative phase between these square waves. Thus if the two signals applied to the vacuum tubes 72 and 71 were 180° out of phase, the sum of the two square waves would be zero. If the two voltages are in phase, their sum is a square wave having twice the amplitude of the square wave in the individual channels. Accordingly intermediate phase relations give intermediate results, which may be indicated by an average reading meter 15 calibrated directly in degrees. The use of a summing circuit of this nature obviates the erratic indication of small angles occurring in other types of circuits or systems.

Figure 5:
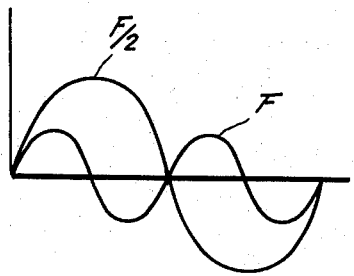
Figures 5 and 6 are graphical representations explanatory of ambiguity elimination by the present system.
Figure 6:
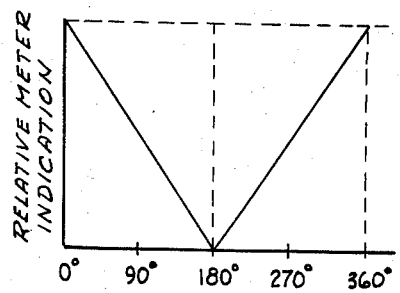

Figures 5 and 6 serve to illustrate the advantages obtained by the system shown in Figure 1, wherein the basic ambiguity of the summing circuit phase indicator is removed through frequency division. It will be noted from Figure 5 that when an input signal of the frequency F passes through a change of 360°, a signal of one-half of the frequency $$\frac{F}{2}$$

will pass through the same period in 180°. This same relation is portrayed in a somewhat different manner in Figure 6, which shows the relative indication of the meter 15 as a function of the phase angle between input voltages. In the one instance at the frequency F, it will be seen that the relative meter indication varies from a maximum at 0° to a minimum at 180° back to a maximum at 360°. The variation of one-half the frequency, however, is from a maximum at 0° to a minimum at 360°, from which it is apparent that the indicator ambiguity previously described has been eliminated. The entire angular spectrum is represented by the range between 0° and 360° which is readily indicated by a meter 15 calibrated in degrees.

While for the purpose of illustrating and describing the present invention certain specific circuit arrangements have been shown, it is to be understood that such variations are contemplated as may be commensurate with the spirit and scope of the invention set forth in the accompanying claims.

I claim as my invention:

1. A system for phase angle measurement of two signals of the same frequency irrespective of shape or amplitude thereof comprising first and second squaring amplifiers, a pair of flip-flop multivibrator frequency dividers having a ratio of 2:1, each of said frequency dividers being connected to the output of one of said amplifiers, and signal responsive means interconnecting said dividers for initiating operation of one frequency divider before the operation of the other frequency divider, and a summing circuit connected to said frequency dividers.

2. A system for phase angle measurement of two signals of the same frequency comprising a plurality of channels for said signals, one channel comprising a squaring amplifier, and a flip-flop multivibrator frequency divider connected thereto, the other channel comprising a squaring amplifier, a gated amplifier connected to said squaring amplifier, and a flip-flop multivibrator controlled thereby, means for controlling said gated amplifier from said first channel, and a summing circuit connected to the multivibrators of both channels.

3. A system for phase angle measurement of two signals of the same frequency irrespective of amplitude or shape of said signals comprising a plurality of channels for said signals, one channel comprising a first squaring amplifier, a first flip-flop multivibrator frequency divider operating at a ratio of 2:1, means connecting the output of said first amplifier to said first frequency divider, the other channel comprising a second squaring amplifier, a gated amplifier connected thereto, and a second flip-flop multivibrator frequency divider operating at a ratio of 2:1, means connecting said second frequency divider to the output of said second amplifier, a circuit interconnecting said one channel with said gating amplifier, and a summing circuit connected to the multivibrator frequency dividers of both channels.

4. A system for phase angle measurement of two signals of the same frequency comprising a channel for each of said signals, one channel comprising a first squaring amplifier and a flip-flop multivibrator frequency divider having a 2:1 ratio connected to said first amplifier, the other channel comprising a second squaring amplifier, another flip-flop multivibrator frequency divider having a 2:1 ratio and a gated amplifier interconnecting said second squaring amplifier and said another frequency divider, a gating circuit interconnecting the output of said first squaring amplifier with said gated amplifier, and an indicating summing circuit connected to the outputs of said frequency dividers.

5. A system for phase angle measurement of two signals of the same frequency comprising a channel for each of said signals, one channel comprising a squaring amplifier, a flip-flop multivibrator frequency divider connected thereto, the other channel comprising a squaring amplifier, a gated amplifier connected to said squaring amplifier, and a flip-flop multivibrator frequency divider connected to said amplifier, a gating circuit interconnecting the output of said first channel squaring amplifier with said gated amplifier of said second channel, and an indicating summing circuit connected to the outputs of both said frequency dividers.

6. A system for phase angle measurement of two signals of the same frequency irrespective of shape or amplitude thereof comprising a shaping amplifier for each signal, a frequency divider for each amplifier having a ratio of 2:1 operated in accordance with said signals, signal responsive means for initiating operation of the reference frequency divider before the operation of the other frequency divider, a circuit connected to said frequency dividers to combine the outputs thereof, and means to produce an indication proportional to the combined outputs.

7. A system for phase angle measurement of two signals of the same frequency comprising a plurality of channels for said signals, one channel comprising a limiting amplifier and a frequency divider connected thereto, the other channel comprising a limiting amplifier, a gated amplifier connected to said limiting amplifier, a frequency divider controlled thereby, means for controlling said gated amplifier from said first channel, a circuit connected to said frequency dividers to combine the outputs thereof, and means to produce an indication proportional to the combined outputs.

8. A system for phase angle measurement of two signals of the same frequency irrespective of the amplitudes thereof comprising a first channel having a first limiting amplifier, means for applying one of said two signals to said first limiting amplifier, and a first frequency divider connected to said first limiting amplifier for producing a first output signal of predetermined amplitude in response to the output of said first limiting amplifier, a second channel comprising a second limiting amplifier, means for applying the other of said two signals to said second limiting amplifier, and a second frequency divider connected to said second limiting amplifier for producing a second output signal in response to the output of said second limiting amplifier, said second output signal having the same amplitude as said first output signal, means responsive to the output of said first limiting amplifier for initiating operation of said first frequency divider before the operation of said second frequency divider, a circuit connected to said first and second frequency dividers for algebraically combining said first and second output signals to produce a third output signal, and means connected to said circuit for producing an indication proportional to said third output signal.

References Cited in the file of this patent

UNITED STATES PATENTS

| | | |
|---|---|---|
| 2,513,477 | Gubin | July 4, 1950 |
| 2,608,683 | Blewett | Aug. 26, 1952 |
| 2,758,277 | Daspit | Aug. 7, 1956 |